United States Patent [19]

Schendel

[11] Patent Number: 5,476,422

[45] Date of Patent: Dec. 19, 1995

[54] MULTI-SPEED TRANSMISSION FOR BICYCLES

[76] Inventor: Robert J. Schendel, 785 Hilltop Dr., Whitelake, Mich. 48386

[21] Appl. No.: 301,863

[22] Filed: Sep. 6, 1994

[51] Int. Cl.⁶ .................................................. F16H 55/30
[52] U.S. Cl. .................................................. 474/49
[58] Field of Search ............................ 474/49–56, 69–71

[56] References Cited

U.S. PATENT DOCUMENTS

| | | |
|---|---|---|
| 4,068,539 | 1/1978 | Nyc . |
| 4,634,406 | 1/1987 | Hufschmid . |
| 4,642,070 | 2/1987 | Walker . |
| 4,696,662 | 9/1987 | Gummeringer . |
| 4,740,190 | 4/1988 | Pike ........................................ 474/49 |
| 4,787,879 | 11/1988 | Pritchard . |
| 4,810,235 | 3/1989 | Husted et al. . |
| 4,816,008 | 3/1989 | Leonard . |
| 4,874,351 | 10/1989 | Jackson . |
| 4,973,289 | 11/1990 | Leonard . |

*Primary Examiner*—Michael Powell Buiz
*Attorney, Agent, or Firm*—Harness, Dickey & Pierce

[57] ABSTRACT

The present invention is directed to an improved variable sprocket transmission of a type that is particularly well-suited for use in multi-speed bicycles. More particularly, a variable sprocket transmission for a multi-speed bicycle is provided which can be smoothly and easily shifted without noise, is reliable, and can be easily used by both experienced and novice bicyclists. The variable sprocket transmission of the present invention can be manually shifted through a sequentially ordered set of distinct speed ratios using a single shift lever or, in the alternative, can be automatically shifted without input from the bicycle rider based on measured operating parameters.

18 Claims, 7 Drawing Sheets

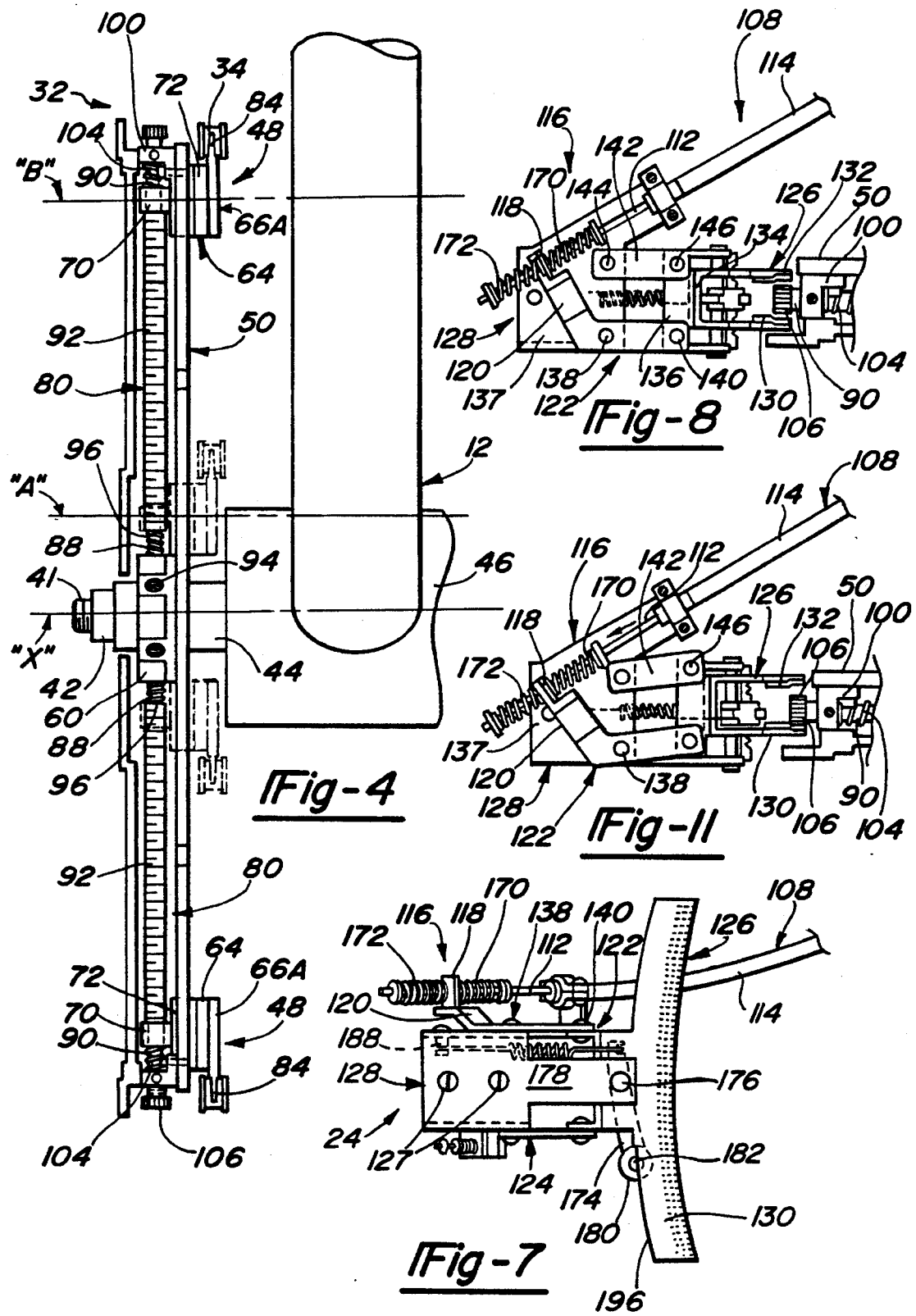

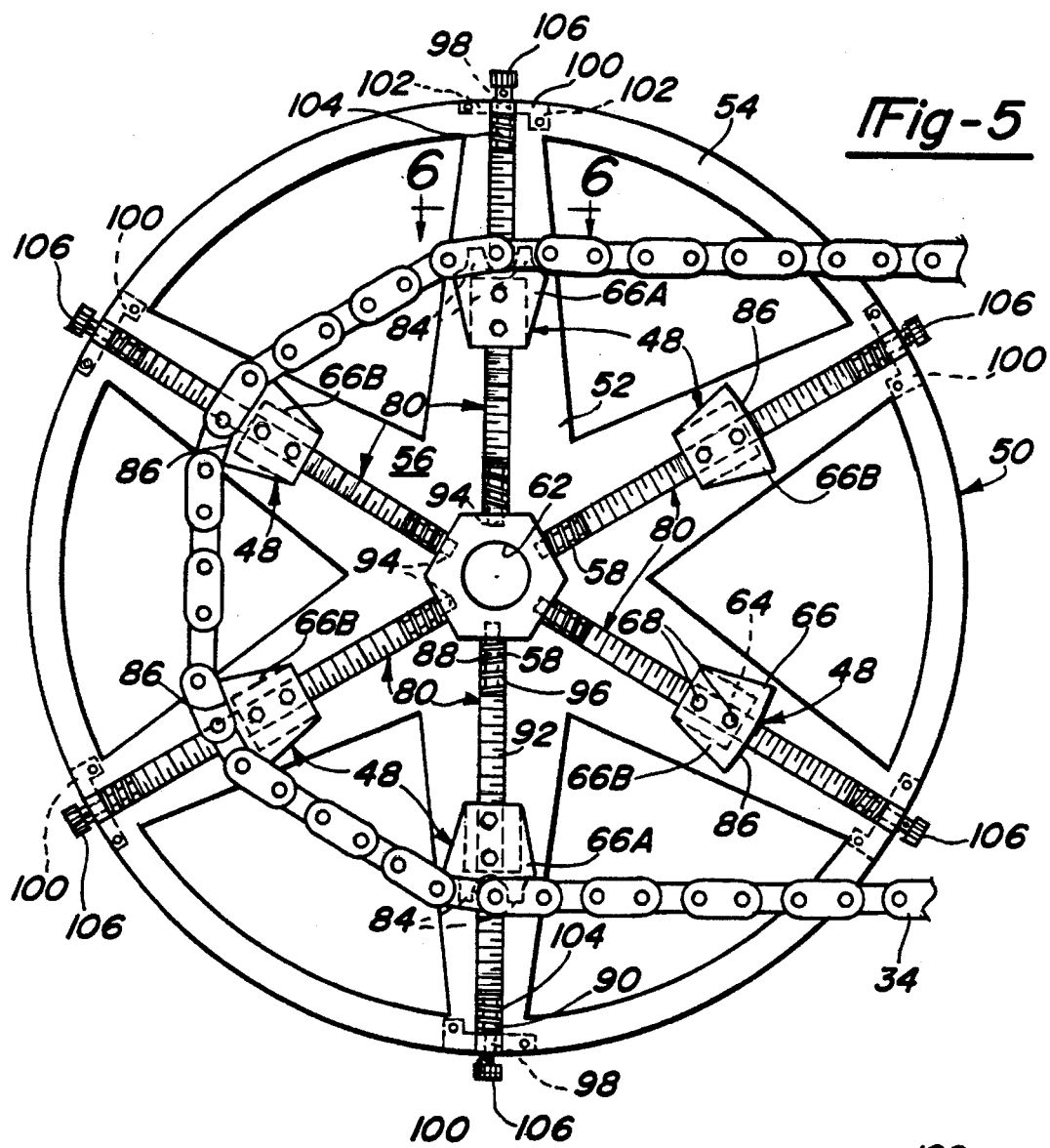
Fig-5
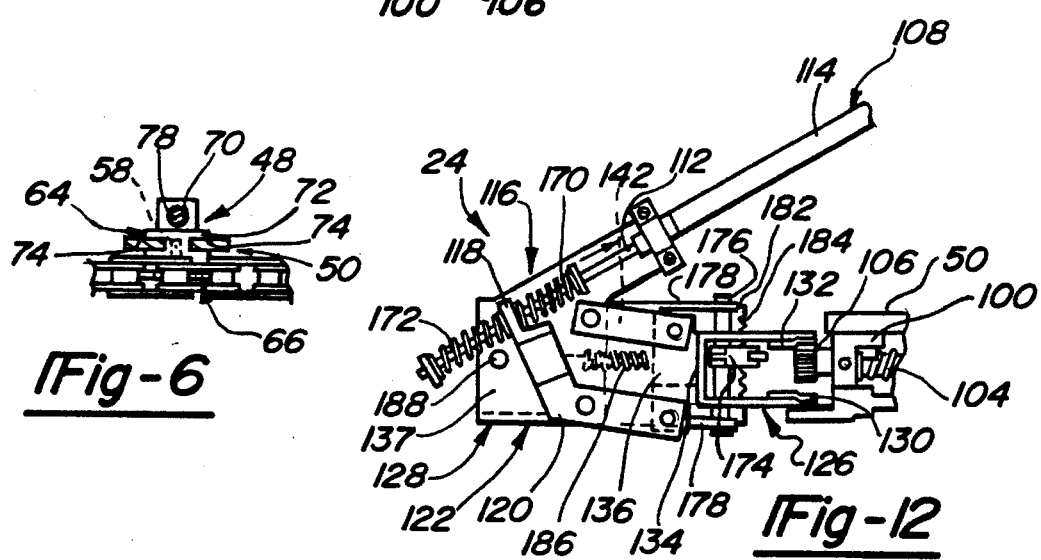
Fig-6
Fig-12

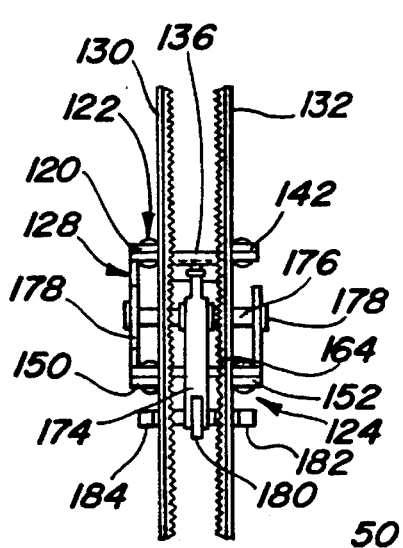
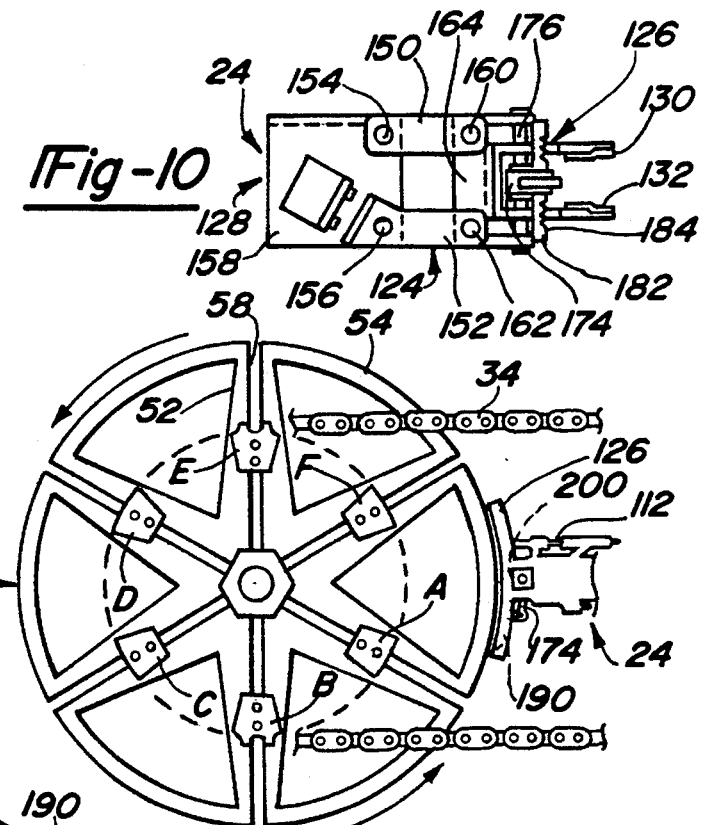
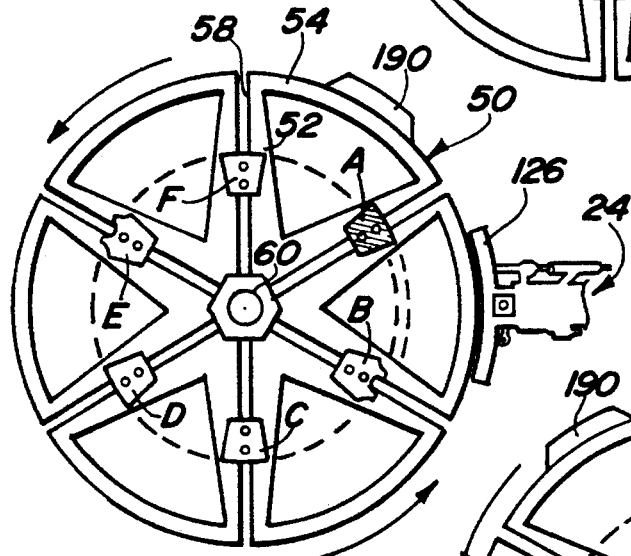
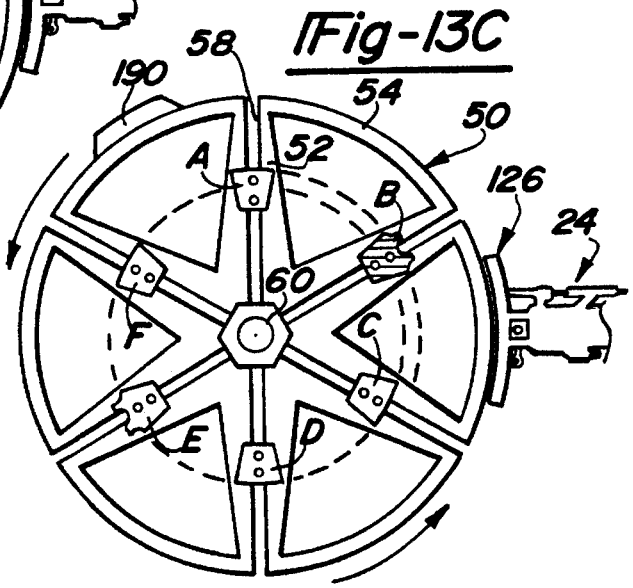

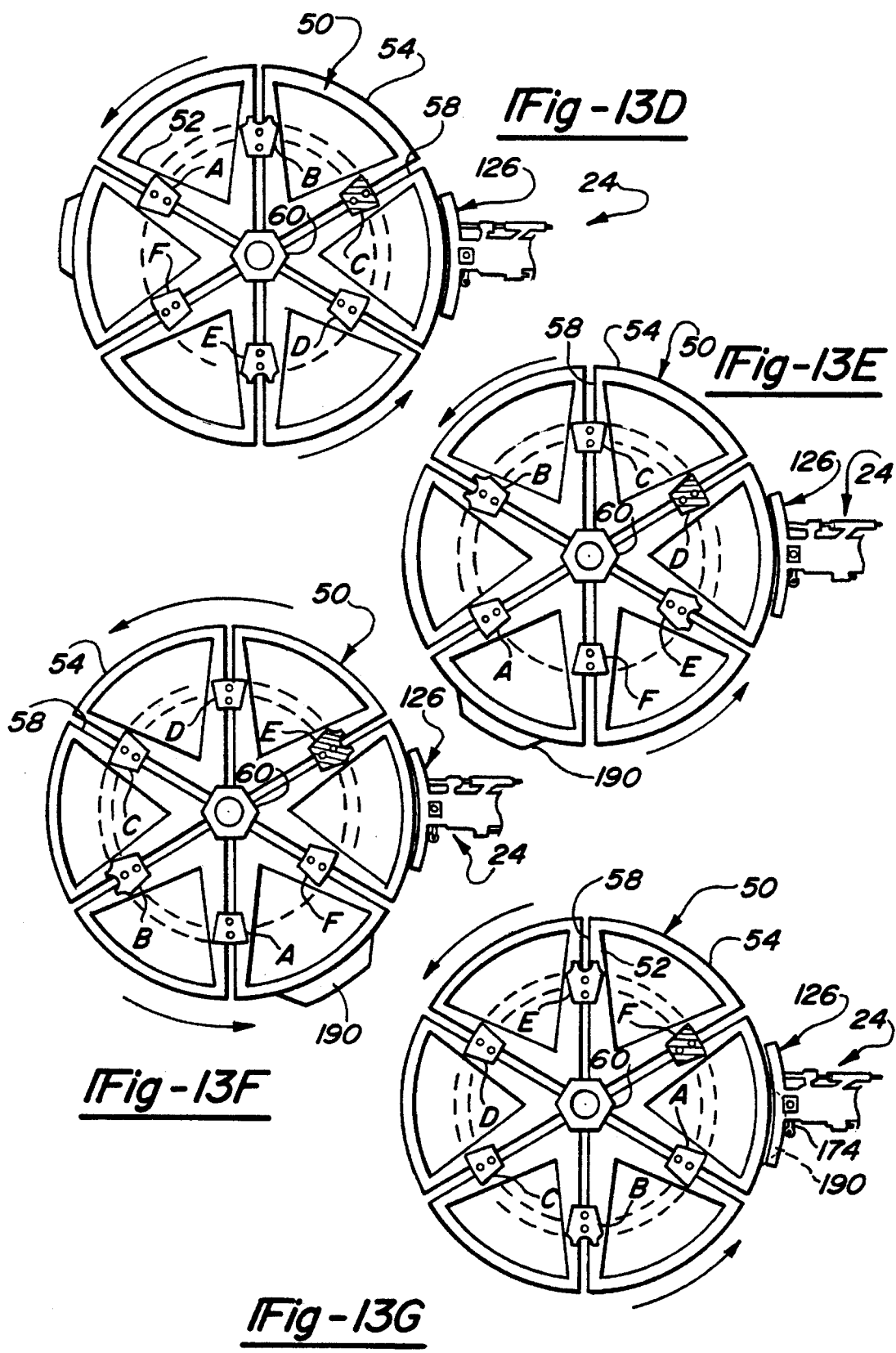

MULTI-SPEED TRANSMISSION FOR BICYCLES

BACKGROUND OF THE INVENTION

The present invention relates generally to multi-speed transmissions for use with bicycles and, in particular, to an improved variable-ratio transmission of the type wherein the effective diameter of a segmented front drive sprocket can be selectively varied for establishing a series of sequentially ordered speed ratios.

As is common knowledge, the vast majority of commercially-available multi-speed bicycles are equipped with a chain-driven transmission of the type generically referred to as "derailleurs". Traditionally, derailleurs are used in combination with front and rear sprocket sets each having a sequence of progressively sized sprocket rings with each derailleur connected to a shift lever via a suitable cable assembly. When it is desired to change gears, the rider selectively manipulates one or both of the shift levers for actuating the corresponding derailleur which, in turn, guides the chain off of one sprocket ring and onto another of the corresponding sprocket set. As is also known, the size relationship between the diameter of the front and rear sprocket rings establishes the various speed ratios that are available for selection by the bicycle rider to accommodate the varying torque and/or speed requirements that may be encountered.

While multi-speed bicycles equipped with conventional derailleur-type transmissions dominate the commercial market, numerous functional and operational drawbacks exist which severely detract from their popularity. More specifically, derailleurs are made of a large number of delicate parts which require frequent maintenance and adjustment and which can be easily damaged. In addition, derailleur transmission systems are hard to operate since the operator must cognitively decide whether to actuate one or both derailleurs to produce the desired gear change. Also, derailleurs are typically noisy and prone to inefficiency due to chain misalignment and/or the rider's failure to completely derail the chain between sprocket rings. Furthermore, front derailleur systems can not be shifted smoothly while the chain is under load which, in turn, detrimentally impacts the ability of the bicycle rider to smoothly pedal through the terrain or road conditions encountered which necessitated the gear change. This inability to shift with the chain loaded is due largely to the fact that, during the traditional derailing process, the chain must lose contact with the sprocket rings. Finally, it is difficult and cumbersome to remove and subsequently reassembly the rear wheel of a multi-speed bicycle equipped with a rear derailleur-type transmission.

In an effort to overcome the above-noted and other shortcomings associated with derailleur equipped multi-speed bicycles, a plethora of alternative variable-ratio transmissions have been proposed. Most commonly, such alternative transmissions are of a type generically referred to as "variable sprocket" transmissions in which the effective diameter of a segmented front drive sprocket is selectively varied with respect to a constant diameter rear driven sprocket for establishing different speed ratios therebetween. From a pure engineering standpoint, such variable sprocket transmissions are superior to derailleur-type transmissions since they can change speed under power in a very smooth manner and the different speed ratios are evenly sequenced from the highest to the lowest speeds for enhanced ease of operation and rider convenience. Various examples of variable sprocket transmission systems for use in multi-speed bicycles are disclosed in U.S. Pat. No. 4,634,406 to Hufschmid, U.S. Pat. No. 4,696,662 to Gummeringer, U.S. Pat. No. 4,787,879 to Pritchard, and U.S. Pat. No. 4,810,235 to Husted. Unfortunately, each of these variable sprocket transmission systems suffers from one or more inherent disadvantages and/or lacks the degree of engineering refinement and functional simplicity to be commercially successful. Thus, while multi-speed bicycles equipped with derailleurs are difficult to operate, they are still considered better than any variable sprocket transmission currently known.

In view of the above, a need exists to develop a variable sprocket transmission for multi-speed bicycles which overcomes the deficiencies known in the prior art, is relatively simple in structure and yet reliable in operation, and can be economically produced.

SUMMARY OF THE INVENTION

Accordingly, the present invention is generally directed to an improved variable sprocket transmission of a type that is particularly well-suited for use in multi-speed bicycles. More particularly, the present invention is directed to a "continuously pull" variable sprocket transmission for a multi-speed bicycle which can be smoothly and easily shifted without noise, is reliable, and can be easily used by both experienced and novice bicyclists. As a related object, the continuous pull variable sprocket transmission of the present invention can be manually shifted through a sequentially ordered set of distinct speed ratios using a single shift lever or, in the alternative, can be automatically shifted without input from the bicycle rider based on measured operating parameters.

Another object of the present invention is to provide a variable sprocket transmission having a mechanism for ensuring precise radial alignment of each adjacent sprocket segment following a gear change.

Pursuant to a preferred construction, the variable sprocket transmission includes a constant diameter rear sprocket, a "segmented" front sprocket assembly driven by a crank assembly, a chain coupling the front sprocket assembly to the rear sprocket, and an actuator mechanism for selectively changing the diameter of the segmented front sprocket assembly. The segmented front sprocket assembly is generally comprised of a guide plate rotatably driven by the crank assembly, a set of threaded shafts extending radially from the guide plate, and a series of sprocket segments that are mounted for non-rotational rectilinear movement on the threaded shafts. Further, some of the sprocket segments are toothed for meshed engagement with the chain while the remaining sprocket segments are non-toothed but adapted to support the chain under tension. In particular, the sprocket segments are retained in radial slots formed in the guide plate and are movable along the length of the slots in response to selective rotation of the threaded shafts. The radial position of the sprocket segments defines an "effective" diameter for the front sprocket assembly which, in conjunction with the rear sprocket, establishes a particular speed ratio. Thus, selection of a desired speed ratio, whether accomplished manually through actuation of a manually-operable shift mechanism or automatically via an electronically-controlled shift system, is predicated on controllably rotating the threaded shafts. To this end, a gear is fixed to the end of each one of the threaded shafts so as to pass between a pair of toothed sectors when the front sprocket assembly is rotatably driven with respect thereto. When it is desired to shift into the next speed ratio, the actuator mechanism is actuated for causing movement of one of the toothed sectors into a position establishing meshed engagement with the gears. As each gear individually meshes and passes over the length of one of the toothed sectors, it and its threaded shaft are caused to rotate a fixed number of revolutions. This particular number of revolutions is selected to move each sprocket segment to a radial position establishing the next higher or lower speed ratio, as selected. More particularly, if it is desired to select the next higher speed ratio, the actuator mechanism is actuated for moving a first one of the toothed sectors into a position permitting sequential meshed engagement of the gears therewith for causing rotation of the threaded shafts in a first direction. In response to rotation of the threaded shafts in the first direction, the sprocket segments move in a radially outward direction along the slots in the guide plate so as to increase their radius and the effective diameter of the front sprocket assembly. Conversely, when it is desired to select the next lower speed ratio, the actuator mechanism is actuated for moving a second one of the toothed sectors into a position establishing contact with the gears so as to cause rotation of the threaded shafts in a second direction. Rotation of the threaded shafts in the second direction causes radially inward movement of the sprocket segments along the slots in the guide plate so as to reduce their radius and the effective diameter of the front sprocket assembly.

Following completion of the gear shift sequence, the actuator mechanism is returned to a neutral position whereat the toothed sectors are centered in a non-contacting position relative to the gears passing therethrough. In addition, the actuator mechanism is located so as to cause radial movement of the sprocket segments while they are free from any load being applied thereon by the chain which, in turn, permits the rider to shift between speed ratios without interrupting driven operation of the crank assembly.

An object related to the above-noted structure of the variable sprocket transmission includes a process for sequentially moving the consecutive sprocket segments of the front sprocket assembly to the next higher or lower speed ratio position while under no chain loading and yet while still maintaining a driven connection between the front sprocket assembly and the rear sprocket to permit the bicycle operator to exert full pedal force during gear shifting, thereby generating a smooth uninterrupted shift sequence.

These and other objects, features and advantages of the present invention will become clear to those skilled in the art upon study of the following detailed description and appended claims when taken in conjunction with the drawings.

BRIEF DESCRIPTION OF THE DRAWINGS

FIG. 4 is a partial front view of the variable sprocket transmission shown in FIG. 2 illustrating the crank assembly and segmented front sprocket assembly with only a pair of the radially movable sprocket segments shown;

FIG. 5 is a side view, similar to FIG. 2 but opposite thereto, showing the sprocket segments moved radially inward to another speed ratio position;

FIG. 6 is a partial sectional view taken along line 6—6 of FIG. 5;

FIG. 7 is an enlarged pictorial view of the actuator mechanism shown in FIG. 2;

FIG. 8 is a top view of the actuator mechanism shown in FIG. 7 in a "neutral" state;

FIG. 9 is a front view of the actuator mechanism shown in FIG. 7;

FIG. 10 is a bottom view of the actuator mechanism shown in FIG. 7;

FIG. 11 is a top view, similar to FIG. 8, showing the actuator mechanism in an "upshift" actuated state;

FIG. 12 is a top view, similar to FIG. 8, showing the actuator mechanism in a "downshift" actuated state;

FIGS. 13A through 13G are side views which schematically illustrate a sequential process for upshifting to a higher speed ratio by increasing the effective diameter of the front sprocket assembly, with each subsequent drawing advanced by 60° of sprocket rotation;

DETAILED DESCRIPTION OF THE INVENTION

Figure 1:
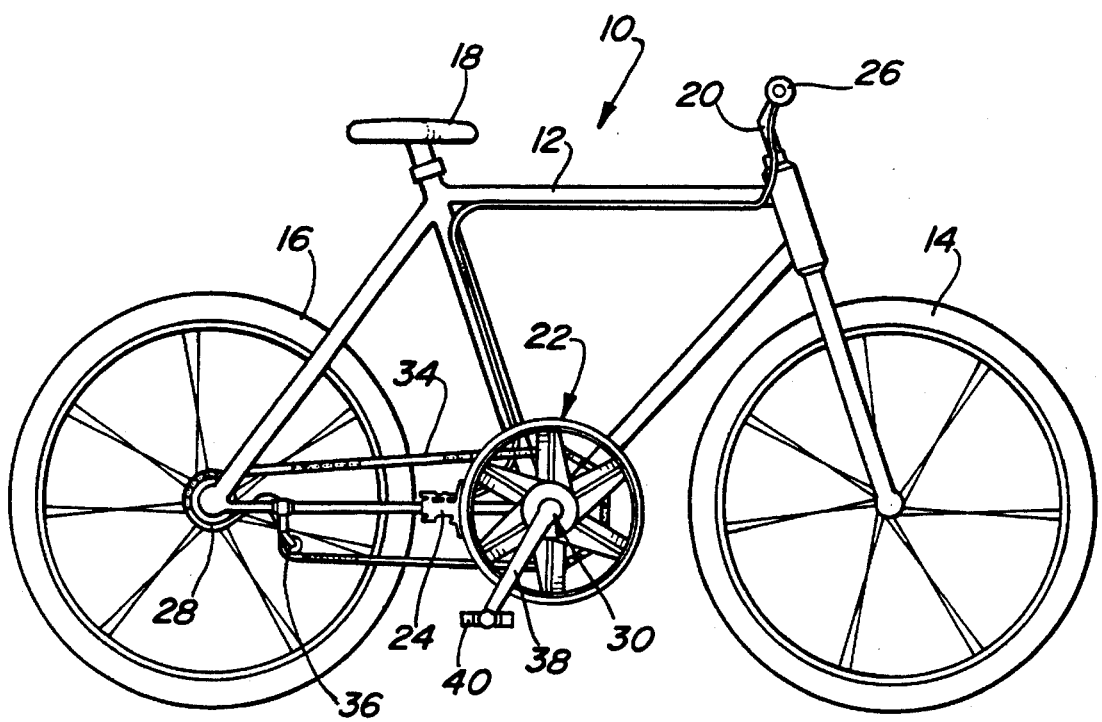
FIG. 1 shows an exemplary bicycle equipped with a variable sprocket transmission of the present invention in conjunction with a manually-operable shift system.

With reference now to the drawings, a bicycle 10 is shown to include a frame 12 supporting a front wheel 14 and a rear wheel 16, a seat 18, handle bars 20, a "variable sprocket" transmission 22, an actuator mechanism 24, and a manually-operable shift mechanism 26. In its most basic form, variable sprocket transmission 22 includes a rear sprocket 28 mounted for rotatably driving rear wheel 16 in a known manner, a crank assembly 30, a "segmented" front sprocket assembly 32 coupled to crank assembly 30, a chain 34 coupling front sprocket assembly 32 to rear sprocket 28, and a chain tensioner 36.

As is otherwise conventional, crank assembly 30 includes a pair of crank arms 38 having foot pedals 40 mounted thereto, with each crank arm 38 interconnected via a threaded stub shaft 41 to a square drive shaft 42 that is journally supported within a tubular extension 44 of a central drive hub 46 provided on bicycle frame 12. In particular, front sprocket assembly 32 is coupled to crank assembly 30 via a conventional non-reversing bearing assembly (not shown) for selectively transferring drive power to rear wheel 16 through a continuous chain drive arrangement upon forward rotary motion of crank assembly 30. Thus, when the rider is not pedalling in a forward direction, but rather is coasting, only crank assembly 30 is stationary such that front sprocket assembly 32 and rear sprocket 28 are always being rotated in response to non-driven rolling movement of rear wheel 16. Thus, power created by the bicycle rider applying rotary force to crank arms 38 is transferred from crank assembly 30 through front sprocket assembly 32 to rear sprocket 28 via chain 34 for rotatably driving rear wheel 16.

To provide means for generating a desired sequence of distinct speed ratios, front sprocket assembly 32 is of a type having a series of individual sprocket segments 48 that can be selectively moved in a radial direction to cause a resulting change in the "effective" diameter of the front drive sprocket which they cumulatively define. While the use of a "variable diameter" front sprocket is known, the present invention is a highly innovative version of this concept which is clearly superior in terms of structure and function to other designs. To this end, FIG. 2 through 6 illustrate the various components of "segmented" front sprocket assembly 32 in greater detail and in accordance with a preferred construction. As seen, front sprocket assembly 32 includes a circular guide plate 50 having a series of generally triangular cut-outs forming equally-spaced and radially extending spokes 52 and a peripheral rim 54. In the preferred embodiment shown, a set of six spokes 52 are formed each emanating from a central portion 56 of guide plate 50. In addition, sprocket segments 48 are retained for sliding movement in radially extending guide slots 58 formed in spokes 52 of circular guide plate 50. Guide slots 58 extend outwardly from close proximity to a central hexagonal lug 60 and pass through peripheral rim 54. Central lug 60 extends transversely to the general plane of guide plate 50 and has a central aperture 62 through which drive shaft 42 extends. Moreover, each side of central hexagonal lug 58 is orthogonally aligned to its respective guide slot 58. Finally, circular guide plate 50 is coupled via a suitable non-reversing bearing for facilitating selective rotation thereof with drive shaft 42 about a crank axis of rotation identified by construction line "X" in FIG. 4, such that sprocket segments 48 rotate in unison with crank arms 38 upon forward driven rotation thereof. As noted, upon rolling forward movement of bicycle 10, crank assembly 30 can be held stationary while front sprocket assembly 32 continues to rotate due to use of the otherwise conventional non-reversing bearing therebetween.

In a preferred form, each sprocket segment 48 is a two-piece assembly having a driven component 64 and a chain-engaging component 66 that are secured together by suitable fasteners 68. All of the driven components 64 are identical and include a nut block 70 and a generally rectangular slide block 72. As best seen in FIG. 6, each slide block 72 has a pair of open-ended slide channels 74 formed in its opposite lateral edges so as to establish a generally I-beam configuration. Each driven component 64 is mounted for non-rotational translatory movement on guide plate 50 by a central lug portion of its I-beam configuration being slid into guide slot 58 from the distal slot opening formed in peripheral rim 54 of guide plate 50. As such, the opposite edges of guide slot 58 are retained within slide channels 74. Thus, slide blocks 72 and, in turn, sprocket segments 48 are retained for non-rotational, reciprocatory movement on circular guide plate 50.

Nut block 70 of each sprocket segment 48 has an internally threaded bore 78 which is adapted to threadably receive the external threads of an elongated threaded shaft 80. Since slide blocks 72 are retained on guide plate 50 in a fashion inhibiting rotation of sprocket segments 48, rotation of threaded shafts 80 causes sliding radial movement of sprocket segments 48 relative to the crank axis "X". As will be detailed, the range of radial movement relative to the crank axis "X" for each sprocket segment 48 is bounded between a lower radial limit, identified by construction line "A", and an upper radial limit, defined by construction line "B". To this end, FIG. 4 shows a pair of diametrically-opposed sprocket segments 48 positioned at their upper radial limit and, for purposes of illustration, another pair is shown in phantom lines positioned at their lower radial limit. In the lower radial limit position, sprocket segments 48 have their smallest radius relative to the crank axis "X" for cumulatively establishing the smallest "effective" diameter of front sprocket assembly 32, thereby defining the lowest speed ratio. The lowest speed ratio (i.e., "1st gear") is preferably a one-to-one ratio with the effective diameter of front sprocket assembly 32 equal to the diameter of rear sprocket 28. Conversely, at the upper radial limit position, sprocket segments 48 have their largest radius relative to the crank axis "X" so as to cumulatively establish the largest "effective" diameter for front sprocket assembly 32, thereby defining the highest available speed ratio. In a preferred form, the highest speed ratio is equal to about 0.3534 to one. That is, rear sprocket 28 revolves 2.83 times for every revolution of front sprocket assembly 32. In its most preferred form, front sprocket assembly 32 establishes nine other radial positions for sprocket segments 48 along threaded shafts 80 between the upper and lower radial limits for providing a total of eleven different yet sequentially-ordered speed ratios from which to choose from. Obviously, the specific type of threads used on threaded shafts 80 and in threaded bore 78 of nut blocks 70 is selected to generate a predetermined amount of radial movement of sprocket segments 48 per revolution of threaded shafts 80.

As noted, each sprocket segment 48 also includes a chain-engaging component 66. However, two distinct types of such chain-engaging components are provided, namely, "grabber" components 66A and "pusher" components 66B. As best seen from FIG. 5, grabber components 66A include a pair of sprocket teeth 84 that are sized for meshed engagement with the continuous links of chain 34. Conversely, each pusher segment 66B has a curvilinear peripheral surface 86 that is adapted to rollingly engage the underside of chain 34. Preferably, the curvilinear profile of peripheral surface 86 replicates the generally curvilinear root profile defined between and adjacent to sprocket teeth 84 for exerting a similar tension loading on chain 34. In the preferred construction, a pair of pusher segments 66B are aligned between each grabber segment 66A such that grabber segments 66A are diametrically opposed.

Figure 2:
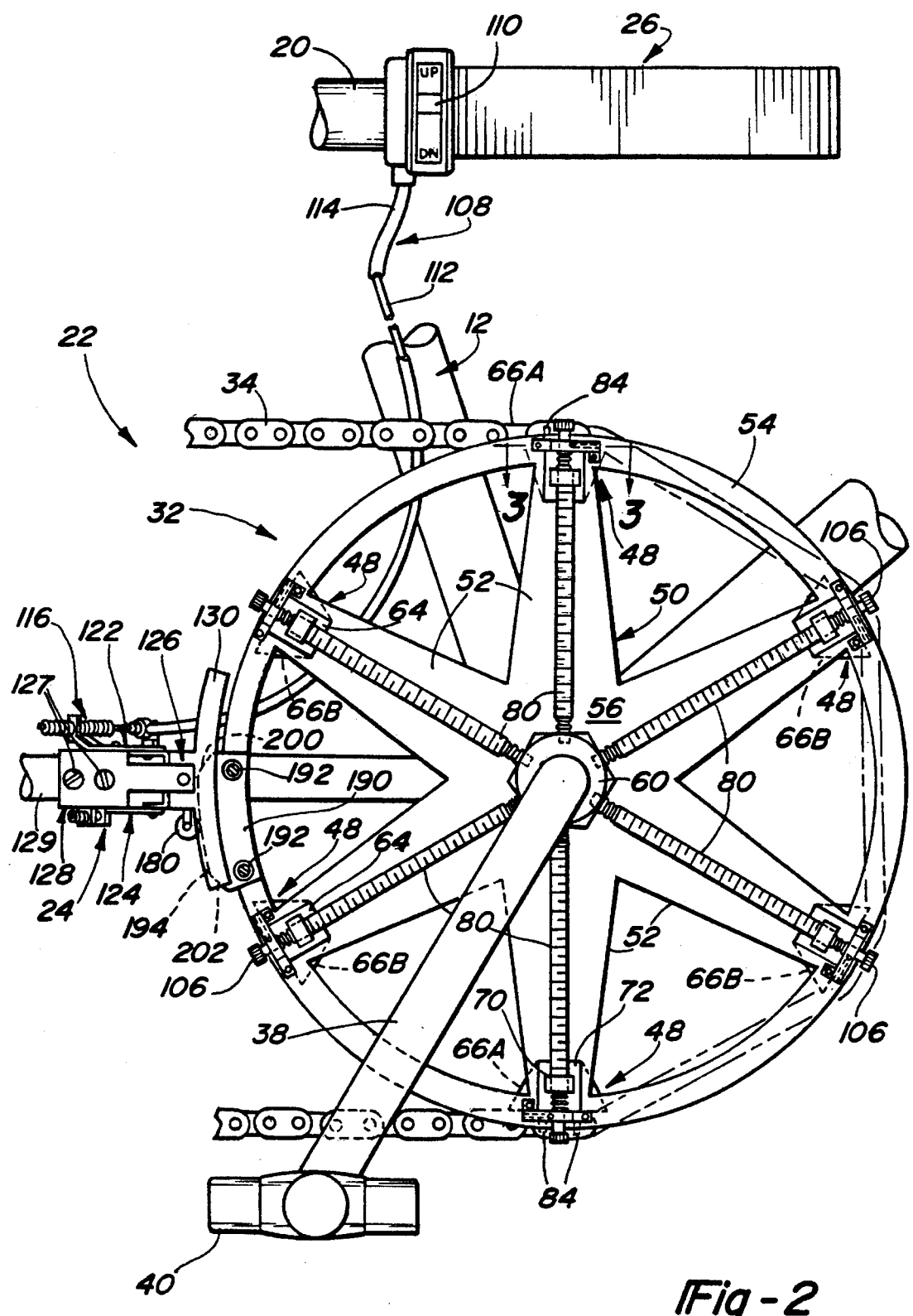
FIG. 2 is an enlarged side view of portions of the bicycle shown in FIG. 1 with various components deleted for purposes of clarity.

With particular reference to FIGS. 2, 4 and 5, each threaded shaft 80 is shown to include a lower non-threaded post 88 and an upper non-threaded post 90 bounding an elongated threaded segment 92. Lower post 88 is cylindrical, has a reduced circular cross-section relative to threaded segment 92, and is journally disposed within a bore 94 formed in central lug 60. In addition, a lower coil spring 96 surrounds lower post 88 and an adjacent portion of threaded segment 92. Similarly, upper post 90 of each threaded shaft 80 is also cylindrical and has a reduced circular cross-section relative to the adjacent threaded segment 92. Moreover, upper post 90 of each threaded shaft 80 passes through a bore 98 formed in a closure bracket 100 that is removably affixed to peripheral rim 54 of circular guide plate 50 via suitable fasteners 102 for closing off the distal open end of each guide slot 58. As seen, upper post 90 of each threaded shaft 80 extends radially past the outermost edge of peripheral rim 54. In addition, an upper coil spring 104 surrounds upper post 90 and an adjacent portion of threaded segment 92.

To provide a means for controllably rotating threaded shafts 80, a gear 106 is fixed to the distal end of each upper post 90 so as to extend outwardly beyond closure bracket 100 and peripheral rim 54 of guide plate 50. As will be described, rotation of gears 106 results in concurrent rotation of threaded shafts 80 which, in turn, causes a proportional amount of radial movement of sprocket segments 48 relative to the crank axis. As will be appreciated, rotation of gears 106 and threaded shafts 80 in a first direction will cause radially outward movement of sprocket segments 48, while rotation of gears 106 and threaded shafts 80 in a second direction causes radially inward movement of sprocket segments 48. When sprocket segments 48 have been moved radially inwardly to their lower radial limit position, lower coil springs 96 are adapted to compress and apply an outwardly directed biasing force on a lower surface of nut blocks 70. In this lower radial limit position, sprocket segments 48 are in their first speed ratio position and the internal threads of nut blocks 70 have disengaged external threads on threaded segments 92 of threaded shafts 80 and only surround lower non-threaded posts 88. Thus, any further radially inward movement of sprocket segments 48 is inhibited upon continued rotation of threaded shafts 80 in the second direction. In this manner, the bicycle rider cannot damage variable sprocket transmission 22 if he/she inadvertently attempts to downshift from 1st gear since continued rotation of threaded shafts 80 in the second direction does not result in further radially inward movement of sprocket segments 48. However, lower coil springs 96 exerts a sufficient biasing force on nut blocks 70 to re-initiate threaded engagement with threaded segments 92 when it is desired to upshift from the lowest (i.e., 1st gear) speed ratio. Similarly, when sprocket segments 48 are moved to their upper radial limit position, upper coil springs 104 are adapted to compress and apply a biasing force on an upper surface of nut blocks 70. In the upper radial limit position, internal threads of nut blocks 70 are disengaged from threaded segments 92 of threaded shafts 80 with upper coil springs 104 adapted to re-initiate threaded engagement therebetween when its desired to downshift from the highest (i.e. 11th gear) speed ratio. This arrangement similarly prevents damage if inadvertent attempts are made to upshift past the highest available speed ratio.

To provide means for permitting the bicycle rider to selectively shift variable sprocket transmission 22 into one of the available speed ratios, actuator mechanism 24 is mounted to bicycle frame 12 in close proximity to front sprocket assembly 32 and is operably connected via a cable assembly 108 to manually-operable shift mechanism 26. In the embodiment shown, manually-operable shift mechanism 26 is mounted to handle bars 20 and includes a shift lever 110 that is movable from the "neutral" position shown to either an "upshift" (UP) position or a "downshift" (DN) position. Accordingly, a preferred construction for actuator mechanism 24 is shown in FIGS. 7 through 12 from various angles and in different operating states to facilitate a better understanding of its operation and the components associated therewith. More particularly, FIG. 7 through 10 illustrate actuator mechanism 24 in a "non-actuated" state when shift lever 110 is in its "neutral" position. Similarly, FIG. 11 illustrates actuator mechanism 24 in an "upshift-actuated" state following movement of shift lever 110 to its "upshift" position, while FIG. 12 illustrates actuator mechanism 24 in a "downshift-actuated" state following movement of shift lever 110 to its "downshift" position.

To coordinate actuation of actuation mechanism 24 in response to selective manipulation of shift lever 110, one end of an inner cable 112, housed with a flexible sheath 114 of cable assembly 108, is connected to shift lever 110. The opposite end of inner cable 112 is connected via a spring-biasing arrangement 116 to an upstanding flange 118 integrally formed on a drive link 120 of an upper linkage assembly 122 that is associated with actuator mechanism 24. Actuator mechanism 24 is shown to also include a lower linkage assembly 124 that, in synchronous coordination with upper linkage assembly 122, is adapted to support a bifurcated shift plate 126 from a bracket housing 128 for movement relative thereto. Bracket housing 128 is removably attached via suitable fasteners 127 to a horizontal rail segment 129 of bicycle frame 12. As seen from FIG. 8, when actuator mechanism 24 is in its "non-actuated" state, circular guide plate 50 rotates relative to shift plate 126 such that gears 106 pass between a laterally-spaced pair of elongated curvilinear toothed sectors 130 and 132. Shift plate 126 has a transverse cross beam 134 interconnecting toothed sectors 130 and 132 for establishing a predefined lateral spacing therebetween. An upper flange segment 136 extending rearwardly from transverse cross beam 134 forms a second link of upper linkage assembly 122. In particular, an intermediate portion of drive link 120 is supported from an upper surface 137 of bracket housing 128 for pivotable movement about a pivot pin 138. The terminal end of drive link 120 is coupled via a pivot pin 140 for pivotable movement relative to upper flange segment 136 of shift plate 126. In addition, one end of a follower link 142 is supported from upper surface 137 of bracket housing 128 for pivotable movement about a pivot pin 144, while its opposite end is pivotably coupled via a pivot pin 146 to upper flange segment 136 of shift plate 126.

FIG. 10 shows the underside of actuator mechanism 24 supporting lower linkage assembly 124 which has a pair of links 150 and 152 each supported at one end on pivot pins 154 and 156, respectively, from an underside surface 158 of bracket housing 128. The opposite ends of links 150 and 152 are pivotably attached at pivot pins 160 and 162, respectively, to a lower flange segment 164 of shift plate 126. As is apparent, upper linkage assembly 122 and lower linkage assembly 124 are adapted to act synchronously for controlling lateral movement of shift plate 126 in response to the direction of movement of shift lever 110. Moreover, the use of a pair of synchronous linkages assemblies provides sufficient rigidity and support of gear rack 126 during movement from the "non-actuated" position of FIG. 8 to either the "upshift-actuated" position of FIG. 11 or the "downshift-actuated" position of FIG. 12. It will, however, be readily apparent to those skilled in this art, that any suitable arrangement for moving shift plate 126 from the "non-actuated" centered position (FIG. 8) to either of the "upshift-actuated" position (FIG. 11) or the "downshift-actuated" position (FIG. 12) in response to movement by the bicycle operator of shift lever 110 to the "upshift" or "downshift" positions, respectively, should be considered an equivalent to that described.

Spring-biasing arrangement 116 includes a pair of coil springs 170 and 172 which apply an equal and opposite preload on opposite sides of upstanding flange 118 of drive link 120 for normally maintaining linkage assemblies 122 and 124 and, in turn, shift plate 126 in the "non-actuated" position shown. As best seen from FIGS. 7 through 9, a roller arm 174 is pivotably supported on a hinge pin 176 extending between side flanges 178 of bracket housing 128. The lower end of roller arm 174 has a crown roller 180 journally supported on an elongated anti-shift pin 182 which has a series of serrated locking grooves 184 formed along its length. The opposite end of roller arm 174 is coupled to one end of a pull spring 186, the other end of which is connected to a post 188 extending from upper surface 137 of bracket housing 128. Pull spring 186 is adapted to normally bias roller arm 174 such that roller 180 and anti-shift pin 182 are positioned forward of hinge pin 176. A cam plate 190 is fixed via suitable fasteners 192 to peripheral rim 54 of circular guide plate 50 between a pair of adjacent pusher segments 66B. Cam plate 190 has a cam surface 194 that is adapted to engage roller 180 of roller arm 174 for pivotably displacing roller arm 174 in opposition to the biasing exerted thereon by pull spring 186 upon every revolution of guide plate 50. When cam plate 190 is disengaged from roller 180 and shift lever 110 is in its self-centering "neutral" position, roller arm 174 is biased by pull spring 186 to its forwardmost position (FIGS. 2 and 7) such that rearward edges 196 of toothed sectors 130 and 132 are lockingly retained within locking grooves 184 for maintaining shift plate 126 in the central non-contacting position shown, whereby gears 106 do not mesh with the teeth on either toothed sector.

In operation, when the bicycle rider moves shift lever 110 to its upshift ("UP") position, corresponding movement of inner cable 112 causes spring 170 to compress which, in turn, applies a compressive force on flange 118 of drive link 120. However, due to locked engagement of rearward edges 196 of gear toothed sectors 130 and 132 with locking grooves 184 on anti-shift pin 182, linkage assemblies 122 and 124 are inhibited from synchronously pivoting about their respective pivots, whereby shift plate 126 remains centered in its non-contacting position. However, upon the rider continuing to pedal crank assembly 30 in a forward rotary motion, a leading edge 200 of cam plate surface 194 engages roller 180 and pivotably displaces roller arm 174 in opposition to the biasing of pull spring 186 so as to disengage rearward edges 196 of toothed sectors 130 and 132 from locking grooves 184 on anti-shift pin 182. In this released condition, the compressive preload stored in spring 170 causes drive link 120 to pivot about pivot pin 138 to synchronously drive linkage assemblies 122 and 124 to the position shown in FIG. 11 which, in turn, causes lateral movement of shift plate 126 to its "upshift-actuated" position. As the rider continues to pedal, roller arm 174 comes off a trailing edge 202 of cam plate surface 194 such that pull spring 186 again biases roller arm 174 into locked engagement with rearward edges 196 of toothed sectors 130 and 132. In this manner, shift plate 126 is moved to and then locked in its "upshift-actuated" position (FIG. 11) whereat gears 106 on the ends of threaded shafts 80 are aligned to individually and sequentially mesh with the teeth of sector 130 upon rotary motion of front sprocket assembly 32. The ratio established between the number of teeth on gears 106 and the number of teeth on toothed sector 130 is selected such that gears 106 and their corresponding threaded shafts 80 are rotated in the first direction a predefined number of complete revolutions for locating sprocket segments 48 at the next higher speed ratio position along the length of threaded shafts 80. Once each sprocket segment 48 has been radially moved on guide plate 50 to its next higher speed ratio position, engagement of leading edge 200 of cam plate 190 with roller 180 will again release rearward edges 196 of toothed sectors 130 and 132 from locked engagement with locking grooves 184 to automatically permit springs 170 and 172 to naturally seek their normal equilibrium condition, assuming that the bicycle rider has released shift lever 110 for its return to its spring-biased self-centering "neutral" position. As such, linkage assemblies 122 and 124 are synchronously pivoted to return shift plate 126 to the "non-actuated" position shown in FIG. 8 with toothed sectors 130 and 132 centered in a non-contacting alignment with gears 106. However, assuming that the rider maintains shift lever 110 in the upshift position, coil spring 170 will maintain linkage assemblies 122 and 124 in the "upshift-actuated" position, thereby permitting continued sequential engagement of gears 106 with toothed sector 130 for again moving each sprocket segment 48 radially outward on guide plate 50 to the next higher speed ratio position. Thus, the rider is able to upshift through an increasing sequence of speed ratios without having to interrupt loading on chain 34 or interrupt forward pedalling of crank assembly 30.

In a similar manner, when the bicycle rider pushes down on shift lever 110, inner cable 112 is moved in the opposite direction for compressing coil spring 172 so as to exert a biasing force against the opposite side of drive link flange 118. As seen in FIG. 12, upon engagement of cam plate 190 with roller arm 174, release of rearward edges 196 of toothed sectors 130 and 132 from locked engagement with grooves 184 on anti-shift pin 182 results in lateral movement of shift plate 126 such that toothed sector 132 is now aligned for subsequent meshed engagement with gears 106. As will be appreciated, since toothed sectors 130 and 132 are arranged in an opposed facing orientation, toothed sector 130 causes rotation of gears 106 and threaded shafts 80 in the first direction which results in radially outward movement of sprocket segments 48 while engagement of gears 106 with toothed sector 132 results in rotation of gears 106 and threaded shafts 80 in the second direction and radially inward movement of sprocket segments 48.

Figure 3:
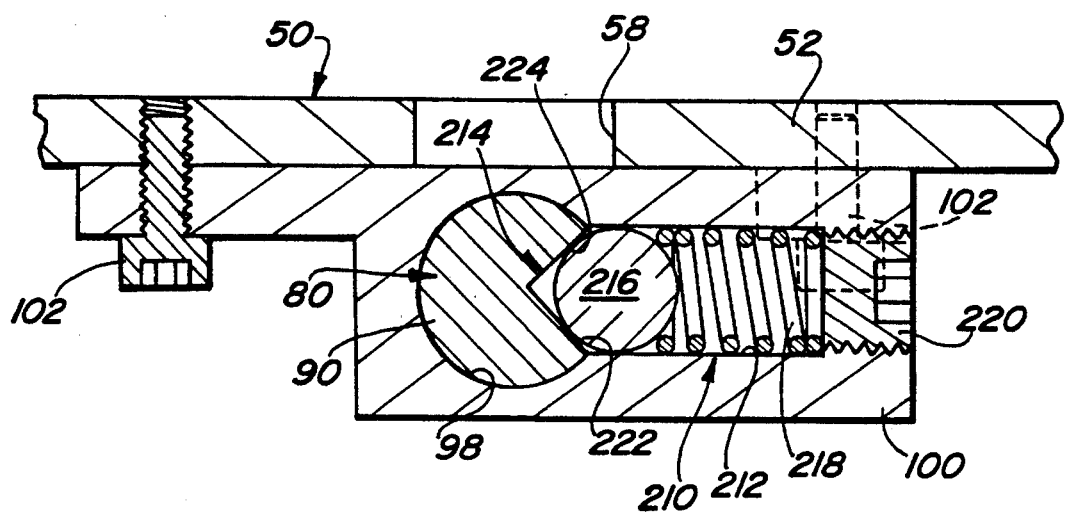
FIG. 3 is a sectional view taken along line 3—3 of FIG. 2.

With particular reference to FIG. 3, a detent system 210 is shown that is provided for inhibiting unwanted rotation of threaded shafts 80 when gears 106 are disengaged from toothed sectors 130 and 132 and shift plate 126 is in its centered non-contacting position. More particularly, a bore 212 is formed in each closure bracket 100 which communicate with bore 98 through which non-threaded upper post 90 of threaded shaft 80 extends. As seen, a triangulated detent groove 214 is formed in upper post 90 which is engaged by a steel ball 216. Steel ball 216 is biased into engagement with detent groove 214 via a spring 218 and a retaining screw 220. The preload applied to spring 218 is easily adjustable by varying the threaded position of retaining screw 220. Thus, when threaded shafts 80 are not being rotated by actuator mechanism 24, steel balls 216 are forced into detent grooves 214 to prevent rotation of threaded shafts 80. However, upon controlled rotation of threaded shafts 80 in response to actuation of actuator mechanism 24, the preload on springs 218 is overcome and balls 216 are retracted into bores 212 so as to permit rotation of threaded shafts 80. In this manner, the precise position of sprocket segments 48 along the length of threaded shafts 80 is maintained. Moreover, detent system 210 automatically corrects for slight errors in either over rotation or under rotation of threaded shafts 80, since the system preforms a self-centering function due to engagement of ball 216 with angulated surfaces 222 and 224 of detent groove 214.

With particular reference now to FIG. 13A through 13G, a process is disclosed for "upshifting" each of the six sprocket segments 48, sequentially identified by reference letters A through F, from a fifth gear speed ratio position to a sixth gear speed ratio position. More particularly, each drawing in the consecutive process is advanced by 60° of rotation for front sprocket assembly 32 such that FIG. 13A illustrates the effective diameter established by all six sprocket segments 48 in their fifth speed ratio position while FIG. 13G illustrates the effective diameter established by all six sprocket segments 48 in their sixth speed ratio position. This sequence allows the bicycle operator to have full forward pedal force during higher or lower gear changes without chain 34 ever loosing meshed contact with at lease one of grabber segments B and E, thus creating a perfectly smooth shift sequence. For purposes of clarity, the threaded rods have been removed to more clearly show the radial movement of sprocket segments 48 on guide slots 58 in circular guide plate 50.

To provide means for insuring meshed engagement of sprocket teeth 84 on grabber segments B and E with the links of chain 34, the following disclosure describes the diametrical size of front sprocket assembly 32 by the number of chain links located between the diametrically-opposed grabber segments B and E. In particular, one-half of the front sprocket circumference shown in FIG. 13A has a total of 21 chain links meshed between grabber segments E and B. For the present invention to work most effectively, two pusher segments are provided between each grabber segment. Moreover, the total number of chain links for every 180° of revolution of front sprocket assembly 32 increases by one during an upshift gear change and decreases by one during a downshift gear change. As will be described, once the shift cycle starts it can not be interrupted until completing a full 360° of revolution, thereby ensuring precise and reliable gear changing.

FIG. 13A illustrates the positioning of the six sprocket segments (A through F) with actuator mechanism 24 in its "upshift-actuated" state immediately following leading edge 200 of cam plate 190 engaging roller arm 174 for causing lateral movement of shift plate 126 such that toothed sector 130 is aligned in the plane of rotation of gears 106. As seen from FIG. 13B, upon 60° of sprocket rotation, pusher segment A has passed through actuator mechanism 24 and has been advanced along its respective threaded rod (not shown) in a radially outward direction to its sixth speed ratio position. FIG. 13C shows that after 120° of sprocket rotation, grabber segment B has also passed through actuator mechanism 24 advancing it to its sixth speed ratio position. FIG. 13D illustrates 180° of rotation with pusher segment C having passed through actuator mechanism 24 advancing it to its sixth speed ratio position. In this position, grabber segments B and E both are meshed with chain 34 yet grabber segment B is in one higher speed ratio position than grabber segment E. As noted, this relationship requires an additional chain link, for a total of 22 chain links to ensure a continued mesh between grabber segment B and chain. FIG. 13E shows that after 240° of rotation, pusher segment D has also passed through actuator mechanism 24 and has advanced to its sixth speed ratio position. Similarly, FIG. 13F shows that after 300° or rotation, grabber segment E has passed through actuator mechanism 24 and is located in its sixth speed ratio position. Finally, FIG. 13G illustrates that, after 360° of rotation, all six sprocket segments are now radially located at their sixth speed ratio position such that the distance from grabber segments E and B is defined by 23 chain links. As also seen by FIG. 13G, cam plate 190 is again acting to bias roller arm 174 for instantaneously releasing shift plate 126 from locked engagement with locking grooves 184 on anti-shift pin 182. If the operator has released shift lever 110 from its "upshift" position, actuator mechanism 24 will automatically return to its centered "non-actuated" position. However, if the bicycle operator maintains engagement of shift lever 110 in its upshift position, shift plate 126 will be maintained in an alignment wherein toothed sector 130 is positioned for meshed engagement with gears 106 such that sprocket segments A through F will be sequentially moved from the sixth speed ratio positions to their respective seventh speed ratio positions while the number of chain links between grabber segments E and B will increase from 23 to 25.

The above-noted embodiment using the number of chain links as the controlling factor is merely exemplary of but one type of consideration permitting continuous pedal force application to crank assembly 30 during a gear shift operation. One skilled in the art would appreciate that, in view of the above teachings, the process of downshifting sprocket segments A through F from their sixth speed ratio positions shown in FIG. 13G back to their fifth speed ratio positions of FIG. 13A is accomplished by actuator mechanism 24 aligning toothed sector 132 in the plane of gears 106 for causing radially inward movement of the six sprocket segments.

Figure 14:
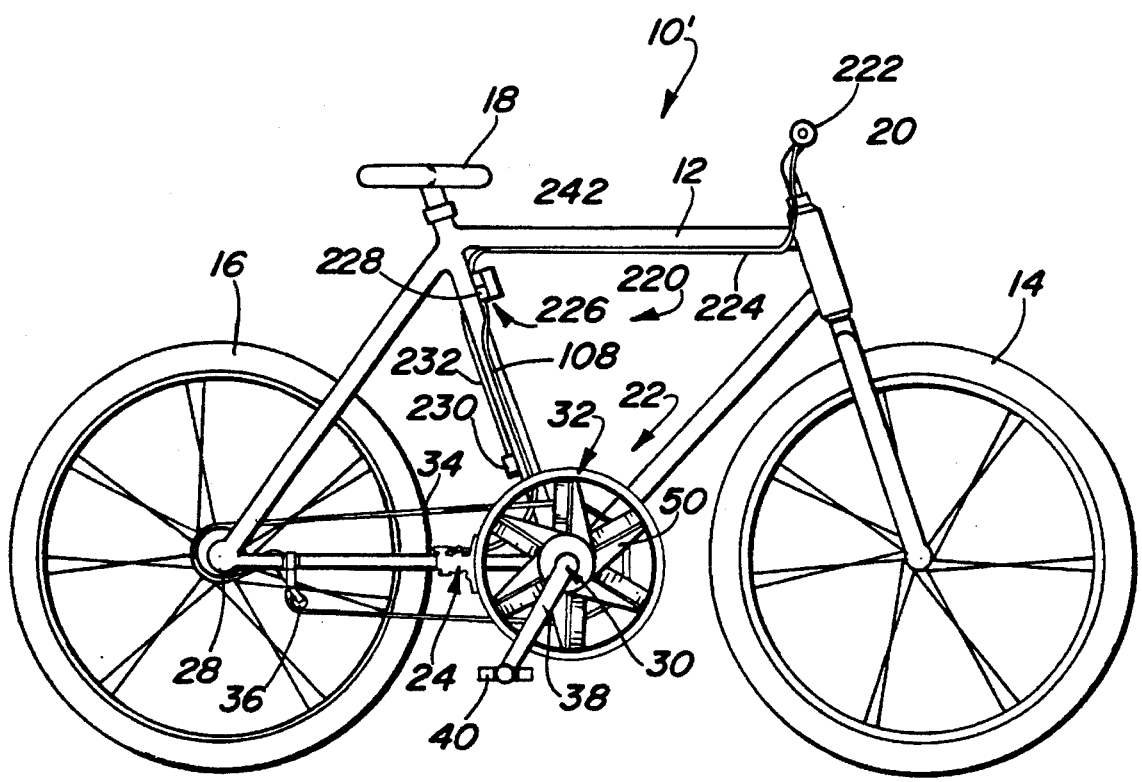
FIG. 14 shows a bicycle equipped with the variable sprocket transmission of the present invention in conjunction with a electronically-controlled shift system.
Figure 15:
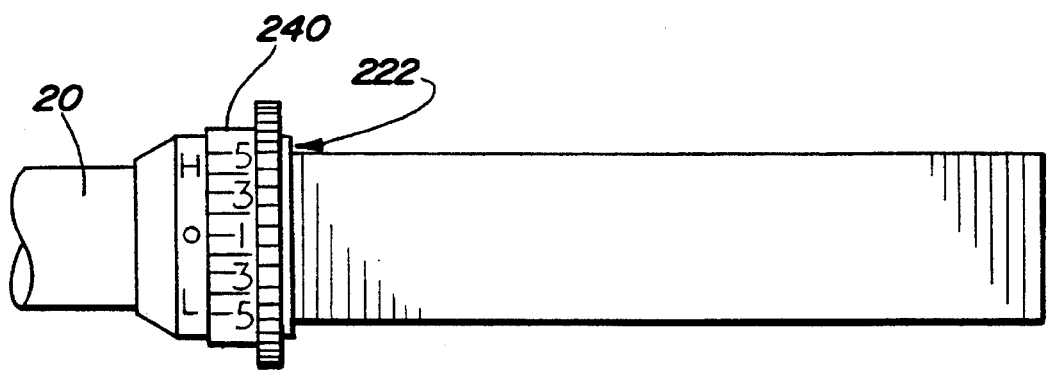
FIG. 15 is an enlarged view of the manually-adjustable speed dial associated with the electronically-controlled shift system of FIG. 14.

With particular reference now to FIGS. 14 and 15, an automatically controlled bicycle 10' is shown that is a modified version of bicycle 10. In general, the primary components of bicycle 10' are identical to that previously described with the exception that manually-operable shift mechanism 26 has been replaced with an electrically-controlled shift system 220. In general, shift system 220 operates to automatically shift between the plural speed ratios (i.e., the 11 speed ratios associated with variable sprocket transmission 22) in response to the magnitude of a measured operating characteristic and without interaction from the bicycle rider. More particularly, automatic shift system 220 is operable to automatically actuate actuator mechanism 24 based on the speed (i.e., RPM) of front sprocket assembly 32. Such a system is highly desireable since the speed ratio available to the rider is always matched to the terrain encountered (i.e., uphill climbing, downhill coasting).

To this end, an adjustment control device 222 is mounted on handlebars which is connected by suitable wires 224 to an electronic control box 226 mounted on frame 12 under seat 18. An actuator 228, housed within control box 226, is coupled via cable assembly 108 to actuator mechanism 24 in a manner similar to that shown in FIGS. 7 through 12. In addition, a speed sensor 230 is mounted to frame 12 in close proximity to circular guide plate 50 for the purpose of sensing the rotary speed of front sprocket assembly 32 and generating an input signal indicative thereof that is delivered via wires 232 to control box 226. In operation, a predetermined threshold speed range for front sprocket assembly 32 is programmed into the control circuit. Thus, upon detection of a front sprocket speed exceeding the upper limit of the threshold range, the electronic control circuit within control box 226 activates actuator 228 for causing corresponding actuation of actuator mechanism 24 in the previously-disclosed manner to upshift variable sprocket transmission 22 for effectively slowing the speed of front sprocket assembly 32. Conversely, if speed sensor 230 signals that the speed of front sprocket assembly 32 is lower than a lower limit of the predetermined threshold range, then actuator 228 is activated for actuating actuator mechanism 24 to downshift variable sprocket transmission 22, thereby effectively increasing the speed of front sprocket assembly 32. While only shown in schematic fashion, actuator 228 can be any electro-mechanical device such as, for example, a solenoid-type force generator that is connected to the upper end of inner cable 112 for controlling the bi-directional movement thereof and, in turn, corresponding actuation of actuator mechanism 24. The band width of the threshold range is selected to facilitate smooth gear changes without excessive actuation or fluctuations of actuation mechanism 24.

Since drive shaft 42 is connected to front sprocket assembly 32 via the non-reversing bearing, when the bicycle rider is not pedalling but rather coasting, only pedalled crank arms 38 and drive shaft 42 are stationary. As such, front sprocket assembly 32, chain 34 and rear sprocket 26 will always turn whenever rear wheel 16 is turning so as to define a continuous chain drive. Thus, when rear wheel 16 is stationary, crank arms 38 and drive shaft 42 can be pedalled backward without moving the continuous chain drive. Upon forward pedalling, non-reversing bearing couples drive shaft 42 to front sprocket assembly 32 to drive rear wheel 16. Thus, during forward movement of bicycle 10', whether being pedalled or coasting, rotation of rear wheel 16 cause rotation of front sprocket assembly 32, the speed of which is monitored by speed sensor 230. Control device 222 is only provided to permit the bicycle rider to adjust the magnitude of the threshold speed range via manipulation of a speed dial 240. By turning dial 240 toward the "High" position, the threshold range will be increased for proportionally adjusting the speed of front sprocket assembly 32 at which automatic gear changes occur. Obviously, the opposite will occur if speed dial 240 is turned toward its "Low" position. Control device 222 is optional since a single threshold range can be programmed in the control circuitry. However, the adjustability provided by speed dial 240 permits the rider to optionally set the transmission to his/her preferred liking and/or to provide different levels of cardiovascular exercise. To provide electric power to control box 226, a rechargeable battery 242 is removably attachable to terminal plugs of control box 226.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A variable sprocket transmission driven by a crank assembly for establishing a plurality of speed ratios, relative to an output member, said transmission comprising:

a first sprocket coupled to the output member;

a second sprocket driven by the crank assembly, said second sprocket including a guide plate having a series of guide slots formed therein, a plurality of chain engaging sprocket segments each retained in one of said guide slots for sliding movement and having an internally threaded bore; threaded shafts journally supported from said guide plate and passing through said threaded bore of said chain engaging sprocket segments, and gear means fixed to each of said threaded shafts such that rotation of said gear means and said threaded shafts in a first direction causes outward radial movement of said chain engaging sprocket segments and rotation of said gear means and said threaded shafts in a second direction causes inward radial movement of said chain engaging sprocket segments, each of the chain engaging sprocket segments being independently radially movable;

a drive chain coupling said first sprocket to at least one pair of said chain engaging sprocket segments;

an actuator mechanism that is movable from a centered position to either of a first actuated position contacting said gear means for causing rotation of said gear means and said threaded shafts in said first direction or a second actuated position contacting said gear means for causing rotation of said gear means and said threaded shafts in said second direction; and shift control means for moving said actuator mechanism between said distinct position.

2. The variable sprocket transmission of claim 1 wherein at least one pair of said sprocket segments include sprocket teeth that meshingly engage said drive chain upon rotation of the crank assembly, and wherein the remaining sprocket segments have a non-toothed surface adapted to engage said drive chain and apply a tensioning load thereon.

3. The variable sprocket transmission of claim 1 wherein said actuator mechanism is located relative to said second sprocket such that in either of said first and second actuated positions said gear means fixed on each threaded shaft sequentially engage said actuator mechanism as each threaded shaft moves past said actuator mechanism in response to rotation of said guide plate.

4. The variable sprocket transmission of claim 3 wherein said gear means engage said actuator mechanism at a location whereat its corresponding sprocket segment has moved out of engagement with said drive chain, whereby radial movement of said sprocket segments occur without any chain loading acting thereon.

5. The variable sprocket transmission of claim 2 wherein said sprocket segments each include a nut block through which said threaded bore extends, a slide block having lateral slide channels in which edges of said guide slots are retained for permitting non-rotational sliding movement of said sprocket segments relative to said guide plate, and a chain-engaging block.

6. The variable sprocket transmission of claim 5 wherein a least a pair of said sprocket segments each have a chain-engaging blocks formed to include a pair of sprocket teeth sized for meshed engagement with links of said drive chain.

7. The variable sprocket transmission of claim 6 wherein the remaining sprocket segments each have a chain-engaging block formed to include a contoured peripheral surface adapted to rollingly engage an underside of said drive chain for exerting a tension loading thereon similar to that exerted by said chain-engaging blocks having said sprocket teeth.

8. The variable sprocket transmission of claim 1 wherein said shift control means includes a manually-operable shift mechanism having a shift lever interconnected to said actuator mechanism such that movement of said shift lever to an upshift position causes movement of said actuator mechanism to said first actuated position for causing rotation of said gear means and said threaded shafts in said first direction so as to outwardly move said sprocket segments and increase said second sprocket diameter for establishing a higher speed ratio, and wherein movement of said shift lever to a downshift position causes movement of said actuator mechanism to said second actuated position for causing rotation of said gear means and said threaded shafts in said second direction to inwardly move said sprocket segments for decreasing said second sprocket diameter and establishing a lower speed ratio.

9. The variable sprocket transmission of claim 8 wherein said actuator mechanism includes first and second toothed sectors such that movement of said actuator mechanism to said first actuated position causes said gear means to meshingly engage said first toothed sector for causing rotation of said gear means and said threaded shafts in said first direction, and wherein movement of said actuator mechanism to said second actuated position causes said gear means to meshingly engage said second toothed sector for causing rotation of said gear means and said threaded shafts in said second direction.

10. The variable sprocket transmission of claim 9 wherein said actuator mechanism includes linkage means interconnected between said shift control lever and said first and second toothed sectors for moving said actuator mechanism between said neutral position and said first and second actuated positions.

11. A variable sprocket transmission driven by a crank assembly for establishing a plurality of speed ratios, relative to an output member, said transmission comprising:

a first sprocket coupled to the output member;

a second sprocket driven by the crank assembly, said second sprocket including a guide plate having a series of guide slots formed therein, a plurality of sprocket segments each retained in one of said guide slots for sliding movement and having an internally threaded bore; threaded shafts journally supported from said guide plate and passing through said threaded bore of said sprocket segments, and gear means fixed to each of said threaded shafts such that rotation of said gear means and said threaded shafts in a first direction causes outward radial movement of said sprocket segments and rotation of said gear means and said threaded shafts in a second direction causes inward radial movement of said sprocket segments;

a drive chain coupling said first sprocket to at least one pair of said sprocket segments;

an actuator mechanism that is movable from a centered position to either of a first actuated position contacting said gear means for causing rotation of said gear means and said threaded shafts in said first direction or a second actuated position contacting said gear means for causing rotation of said gear means and said threaded shafts in said second direction; and wherein said shift control means includes an electrically-controlled shift system that is operable in response to a speed signal generated by a speed sensor and which is indicative of the rotary speed of said second sprocket, said speed signal being delivered to an electric control unit having power-operated means interconnected to said actuator mechanism such that when said speed signal exceeds a predetermined threshold value said power-operated means is activated for causing movement of said actuator mechanism to said first actuated position for rotating said gear means and said threaded shafts in said first direction so as to increase said second sprocket diameter and establish a higher speed ratio, and when said speed signal indicates that the speed of said second sprocket is below said threshold value then said power-operated means is activated for causing movement of said actuator means to said second actuated position for rotating said gear means and said threaded shafts in said second direction to decrease said second sprocket diameter and establish a lower speed ratio.

12. The variable sprocket transmission of claim 11 wherein said actuator mechanism includes first and second toothed sectors such that movement of said actuator mechanism to said first actuated position causes said gear means to meshingly engage said first toothed sector for causing rotation of said gear means and said threaded shafts in said first direction, and wherein movement of said actuator mechanism to said second actuated position causes said gear means to meshingly engage said second toothed sector for causing rotation of said gear means and said threaded shafts in said second direction.

13. The variable sprocket transmission of claim 12 wherein said actuator mechanism includes linkage means interconnected between said power-operated means and said first and second toothed sectors for automatically moving said actuator mechanism between said neutral position and said first and second actuated positions.

14. A variable sprocket transmission driven by a crank assembly for establishing a plurality of speed ratios, relative to an output member, said transmission comprising:

a first sprocket coupled to one of the output member and the crank assembly;

a second sprocket coupled to the other of the output member and the crank member, said second sprocket including a guide plate and a plurality of chain engaging sprocket segments mounted for independent radial movement with respect to said guide plate;

a drive chain coupling said first sprocket to at least one pair of said chain engaging sprocket segments; and means for independently advancing each of said plurality of chain engaging sprocket segments in a radial direction under a substantially no-load condition, said means for independently advancing operatively interconnecting said guide plate and said chain engaging sprocket segments.

15. The variable sprocket transmission of claim 14, wherein said guide plate of said second sprocket includes a series of guide slots formed therein, and further wherein said plurality of chain engaging sprocket segments each have an internally threaded bore and are each retained in one of said guide slots for sliding movement.

16. The variable sprocket transmission of claim 15, further comprising threaded shafts journally supported from said guide plate and passing through said threaded bore of said chain engaging sprocket segments, and gear means fixed to each of said threaded shafts such that rotation of said gear means and said threaded shafts in a first direction causes outward radial movement of said chain engaging sprocket segments and rotation of said gear means and said threaded shafts in a second direction causes inward radial movement of said chain engaging sprocket segments.

17. The variable sprocket transmission of claim 16, further comprising an actuator mechanism that is movable from a centered position to either of a first actuated position contacting said gear means for causing rotation of said gear means and said threaded shafts in said first direction or a second actuated position contacting said gear means for causing rotation of said gear means and said threaded shafts in said second direction.

18. The variable sprocket transmission of claim 17, further comprising shift control means for moving said actuator mechanism between said first and second actuated positions distinct position.

* * * * *